United States Patent
Kobayashi et al.

(10) Patent No.: US 6,654,742 B1
(45) Date of Patent: Nov. 25, 2003

(54) METHOD AND SYSTEM FOR DOCUMENT COLLECTION FINAL SEARCH RESULT BY ARITHMETICAL OPERATIONS BETWEEN SEARCH RESULTS SORTED BY MULTIPLE RANKING METRICS

(75) Inventors: Mei Kobayashi, Yokohama (JP); Kohichi Takeda, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,159

(22) Filed: Feb. 11, 2000

(30) Foreign Application Priority Data

Feb. 12, 1999 (JP) .......................................... 11-034166

(51) Int. Cl.⁷ ............................................. G06F 17/30
(52) U.S. Cl. .................. 707/7; 707/1; 707/2; 707/3; 707/5; 707/500.1; 707/513
(58) Field of Search .................. 707/1–10, 100–104.1, 707/200–205, 500.1–501.1, 511–515, 532–533, 900, 907; 704/1, 9, 240, 251, 257, 268, 276; 345/835, 845, 968

(56) References Cited

U.S. PATENT DOCUMENTS

| | | | |
|---|---|---|---|
| 5,241,671 A | * 8/1993 | Reed et al. ................. | 345/473 |
| 5,696,962 A | * 12/1997 | Kupiec ............................ | 704/9 |
| 5,848,407 A | * 12/1998 | Ishikawa et al. ................ | 707/2 |
| 5,873,076 A | * 2/1999 | Barr et al. ............... | 704/270.1 |
| 5,907,840 A | * 5/1999 | Evans ........................... | 707/5 |
| 5,920,859 A | * 7/1999 | Li ................................ | 707/10 |
| 5,983,216 A | * 11/1999 | Kirsch et al. ................... | 707/2 |
| 5,991,755 A | * 11/1999 | Noguchi et al. ................ | 704/9 |
| 6,012,053 A | * 1/2000 | Pant et al. ................... | 345/866 |
| 6,073,130 A | * 6/2000 | Jacobson et al. .............. | 707/3 |
| 6,256,622 B1 | * 7/2001 | Howard et al. ................ | 707/1 |
| 6,285,999 B1 | * 9/2001 | Page ............................. | 707/5 |
| 6,327,590 B1 | * 12/2001 | Chidlovskii et al. ........... | 707/5 |

FOREIGN PATENT DOCUMENTS

| | | | | |
|---|---|---|---|---|
| EP | 1006458 | * 6/2000 | .................... | 17/30 |
| JP | 04-166259 | 6/1992 | | |
| JP | 08-134794 | 5/1996 | | |
| JP | 08-304372 | 11/1996 | | |
| JP | 10-143530 A | 11/1996 | ........... | G06F/17/30 |

OTHER PUBLICATIONS

Brian T Bartell et al., Automatic Combination of Multiple Ranked Retrieval Systems (1994) Research and Development in Information Retrieval.*

Page L, Brin S, Motwani R, Winograd T (1998) The PageRank citation ranking: Bring order to the Web. Technical Report, Stanford University, 1998.*

* cited by examiner

Primary Examiner—Srirama Channavajjala
(74) Attorney, Agent, or Firm—Fay, Sharpe, Fagan, Minnich & McKee, LLP (57) ABSTRACT

A method and a system for sorting a specific collection of documents in various orderings, and defining a new ranking metrics by composing multiple ranking to provide a user with highly relevant search results is provided. Collections of documents are sorted with multiple ranking metrics, a new collection of documents in higher-ranking positions of the sorted collections of documents is determined; and an arithmetical operation between the new collections of documents in higher-ranking positions is performed. A search result is determined by the documents in higher-ranking positions as result of the arithmetical operation. Final search results are acquired by performing an arithmetical operation among specific (with fixed search results) collections of documents sorted in various orderings. The most suitable arrangement of search results can be specified by interactively combining such ranking metrics.

17 Claims, 5 Drawing Sheets

TABLE OF INFORMATION FIELD NEWS

- [10/31] YYY SERVICES OF XXX START IN LIMITED AREA
- [10/31] XXX ANNOUNCE A 599-DOLLAR PC
- [10/31] LCD PANELS SHORT OF SUPPLY
- [10/31] XX ELECTRIC FOR PDP HIGH-INTENSITY TECHNOLOGY
- [10/31] XX ELECTRIC TO CLOSE AFFILIATED COMPANY
- [10/31] XXX & YYY OPEN ELECTRONIC COMMERCE CENTER
- [10/31] XXX TO START SERVICE IN SUMMER '99
- [10/31] XXX RENEWS PC FOR BUSINESSES
- [10/31] XX ELECTRIC SHOW DECREASE IN INCOME & PROFIT
- [10/31] XX ELECTRIC ANNOUNCE INTERIM RESULTS
- [10/31] XXX START BUSINESS
- [10/31] XXX RELEASE "ZZZ '99 JAPANESE VERSION"
- [10/31] XXX SHOW 9% INCREASE IN PC SHIPMENT IN '98
- [11/02] 30% OF BUSINESSES EXPERIENCE ILLEGAL ACCESS
- [11/02] XXX HANDLE ZZZ SOFTWARE IN PACKAGE
- [11/02] XXX PROTOTYPE FLEXIBLE BATTERY
- •
- •
- •

RESULT OF SEARCHING BY "COMPUTER" (STEP 404)

(DEGREE OF RELEVANCE ↑)
- [10/31] XXX RENEWS PC FOR BUSINESS
- [10/31] XXX ANNOUNCE A 599-DOLLAR PC
- [10/31] XXX SHOW 9% INCREASE IN PC SHIPMENT IN '98
- [10/31] RELEASE "ZZZ '99 JAPANESE VERSION"
- [11/02] 30% OF BUSINESSES EXPERIENCE ILLEGAL ACCESS
- [11/02] XXX HANDLE ZZZ SOFTWARE IN PACKAGE
- [10/31] LCD PANELS SHORT OF SUPPLY

PLACES ARTICLES INCLUDING "COMPUTER" OR ITS RELATED WORDS IN HIGHER-RANKING POSITIONS

RANKING BY DEGREE OF RELEVANCE TO "SOFTWARE" FIELD (STEP 408)

(DEGREE OF RELEVANCE ↑)
- [10/31] XXX RELEASE "ZZZ '99 JAPANESE VERSION"
- [11/02] XXX HANDLE ZZZ SOFTWARE IN PACKAGE
- [10/31] XXX & YYY OPEN ELECTRONIC COMMERCE CENTER
- [10/31] XXX START BUSINESS
- [10/31] XXX ANNOUNCE A 599-DOLLAR PC
- [10/31] XXX RENEWS PC FOR BUSINESSES

NOT INCLUDING "SOFTWARE" AS A KEYWORD, BUT DEGREE OF RELEVANCE CALCULATED WITH MORE WEIGHT ON KEYWORDS FREQUENTLY APPEARING IN SOFTWARE RELATED ARTICLES

RANKING "COMPUTER" RELATED NEWS BY THE SUM OF DEGREES OF RELEVANCE TO "SOFTWARE" FIELD (STEP 412)

(DEGREE OF RELEVANCE ↑)
- [10/31] XXX RELEASE "ZZZ '99 JAPANESE VERSION"
- [11/02] XXX HANDLE ZZZ SOFTWARE IN PACKAGE
- [10/31] XXX ANNOUNCE A 599-DOLLAR PC
- [10/31] XXX RENEWS PC FOR BUSINESS

COMPUTER RELATED NEWS, ESPECIALLY THOSE HIGHLY RELEVANT TO SOFTWARE FIELD ARE COLLECTED IN HIGHER-RANKING POSITIONS

METHOD AND SYSTEM FOR DOCUMENT COLLECTION FINAL SEARCH RESULT BY ARITHMETICAL OPERATIONS BETWEEN SEARCH RESULTS SORTED BY MULTIPLE RANKING METRICS

BACKGROUND OF THE INVENTION

The present invention relates to a method and a system for searching information corresponding to a large amount of documents, particularly to a method and a system for acquiring a final search result by arithmetical operations between search results sorted by different ranking metrics.

DESCRIPTION OF THE RELATED ART

As in the case of an Internet search, it is not unusual that search results amount to tens of thousands when information is searched with a keyword from a large amount of documents. To find a document of the user's interest from such enormous amounts of search results, the following means for a search are known:

- changing search conditions by seeing several highly-ranked ones of the search result provided by a search engine and;
- sorting them according to a menu provided by a search engine.

The former method includes a method wherein, besides changing a search condition by the user, specifying a condition such as "essential" or "not to be included" for each keyword displayed by a search engine, or providing a sample document to a search engine to get highly ranked documents results where the contents are similar to the sample document. While such methods are known as relevance feedback, it was not possible for them to cope with designation of relevance from multiple viewpoints such as current as possible and also deeply related to the computer field. The latter menu method includes a search by document type, a search by Web site, etc. However, while this method is also convenient as classification according to document types, it is not effective for a search of Web pages in large quantities.

In addition, there is Reference 1 (Japanese Unexamined Patent Publication No. Hei 10-143530) as a method for combining multiple searching methods by using multiple searching schemes. This Reference 1 is an approach which is close to a method of combining multiple search engines so as to obtain a more relevant search result. However, in the case of a method as in Reference 1, the search result is often in very large quantities due to multiple searching methods. Even if the larger number of correct answers can be acquired by combining search results, it cannot be expected that all of the highly-ranked search results are arranged in the most relevant ordering to a user's demand. A user must sequentially scan in order to find truly necessary data from such enormous search results. In the case of combining search results, the process will be under huge load since it is necessary to always seek search results of the entire database and logically combine them.

Moreover, the conventional searching technologies do not provide the means for meeting the following demands which are quite natural:

- sorting the first several tens or hundreds of elements of the subject; and data set in a specific ordering or in various orderings; and
- arranging further in order of decreasing relevance, since the amount is too large to check all the elements even after possible narrowing.

SUMMARY OF THE INVENTION

An object of the present invention is to provide a searching method, computer program product, and system for sorting a specific collection of documents in various orderings.

Another object is to provide a searching method, computer program product, and system for defining a new ranking metric by composing multiple ranking metrics to provide a user with highly relevant search results.

A further object is to provide a searching method, computer program product, and system for additionally specifying the most suitable arrangement by interactively combining ranking metrics.

A still further object is to provide a searching method, computer program product, and system for presenting a specific search result by sorting them in various orderings.

A still further object is to provide a searching method, computer program product, and system wherein, the larger the number of collected data is, the larger the likelihood of finding important data by sorting grows.

A still further object is to provide a searching method and a system of high practicality and scalability which only requires sorting of the search results acquired by the first search.

To attain the above objects, multiple rankings (weightings) are used when information is searched from a large amount of data (documents). Thus, in the case that relevant data does not gather in higher-ranking positions in a single ranking/ordering, relevant data originally in low ranks can be more easily discovered by ranking metrics from different viewpoints. Moreover, the sum, difference, intersection, etc. of the ones ranked high in more than one rankings are acquired. Thus, a means for collecting important data in higher-ranking positions is provided.

And more specifically, in searching documents related to prescribed information from a collection of documents, it is organized to sort the collection of documents with multiple ranking metrics; determine a new collection of documents in higher-ranking positions of the sorted collections of documents; perform arithmetical operation between the new collections of documents in higher-ranking positions; and determine documents in higher-ranking positions of a result of the arithmetical operation as a search result. To "rank" and to "sort" (by ranking metrics, relevance or weight) are used herein as the same meaning.

By way of example, "multiple ranking metrics" includes, but is not limited to: date and time of document publication; document size; frequency of document update; number of links included in a document; extent of inclusion of terminology related to prescribed information; number of keywords related to prescribed information; etc.

By way of example, "arithmetical operation" includes, but is not limited to: the sum of the collections of documents; the intersection of the collections of documents; or the difference between higher-ranking positions of the sorted collections of documents.

Namely, the final search results are acquired by performing arithmetical operation among specific (with fixed search results) collections of documents sorted in various orderings and not by narrowing the search results to gradually reduce the candidates. It also makes it possible to additionally specify the most suitable arrangement of search results by interactively composing such ranking metrics.

Thus, it becomes possible, by utilizing multiple ranking metrics, to rank a search result of a large amount of data so that highly relevant data from a viewpoint prescribed by a user gathers in higher-ranking positions. In the present invention, as ranking metrics for arranging data other than ranking metrics (order of relevance to a query) provided as standard, various orderings provide ranking metrics as above, such as an ordering of the date of document publication, an ordering of size of each data, decreasing order of frequency of document update, decreasing order of number of links included in a document, decreasing order of frequency of inclusion or decreasing order of number of terminology included in a specific field, or decreasing order of number of specified keywords.

The present invention is not only applicable to all the Internet search engines but also available for display of database records in a flexibly ordered manner, so it provides a very effective searching technique as a front end for information searching in general. While it is difficult, by ranking metrics through a mere search with keywords and a degree of their matching, to completely eliminate unnecessary documents adequately containing keywords (SPAM), it becomes easier to find really desirable documents by using the method of the present invention. Moreover, the present invention is capable of not only providing a powerful means for enhancing and differentiating a search engine but also becoming a promising tool for dramatically improving information searching capability of a search engine accumulating data in large quantities.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope.

FIG. 5 is an example of a search result by the present invention.

DETAILED DESCRIPTION OF THE INVENTION

Figure 1:
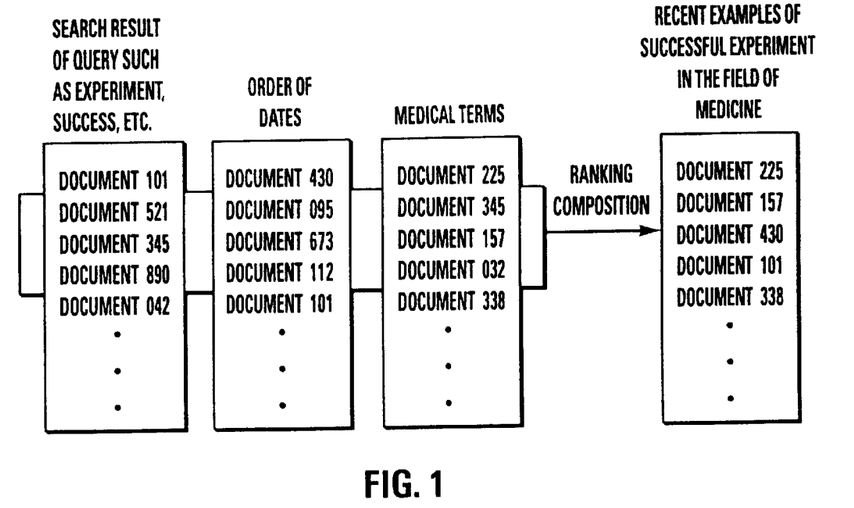
FIG. 1 is a diagram for showing an overview of the searching method of the present invention.

FIG. 1 shows an outline of the searching method of the present invention. Other than collections of documents searched in decreasing order of relevance by ranking metrics provided as a standard, namely a query of "experiment and success," for instance, collections of documents of successful examples of recent medical experiment are acquired as final search result by composing ranking of collections of documents in higher-ranking positions in multiple ranking metrics data (in this case, orderings of date and the number of medical terms). As it is not limited to these, ranking metrics in various fields are possible likewise.

In addition, there are two kinds in all ranking metrics, namely descending/ascending order, and besides, in the case of date or size, it is possible to specify order of being close to/far from a specific value such as 1995 or 1 MB. Likewise, all ranking metrics can be modified to specify not a specific value but an arbitrary value so that it becomes the top and other elements are in a line in decreasing order of closeness to the top element.

As a kind of arithmetical operation (composition of ranking metrics), it is possible to compose the following ranking metrics (where plural ranking metrics are referred to as A, B):

* The sum of A and B (A+B): Ranking metrics wherein elements which are in higher-ranking positions of A or in higher-ranking positions of B will be in higher-ranking positions.

* The intersection of A and B (A*B): Ranking metrics wherein elements which are in higher-ranking positions of A and besides, in higher-ranking positions of B will be in higher-ranking positions.

* The difference of A and B (A−B/B−A): Ranking metrics wherein elements which are in higher-ranking positions of A but not in higher-ranking positions of B will be in higher-ranking positions, or vice versa.

Moreover, as for a vector space model which is predominant as a means for characterizing a collection of documents, it is possible to generate various ranking metrics to it.

Figure 2:
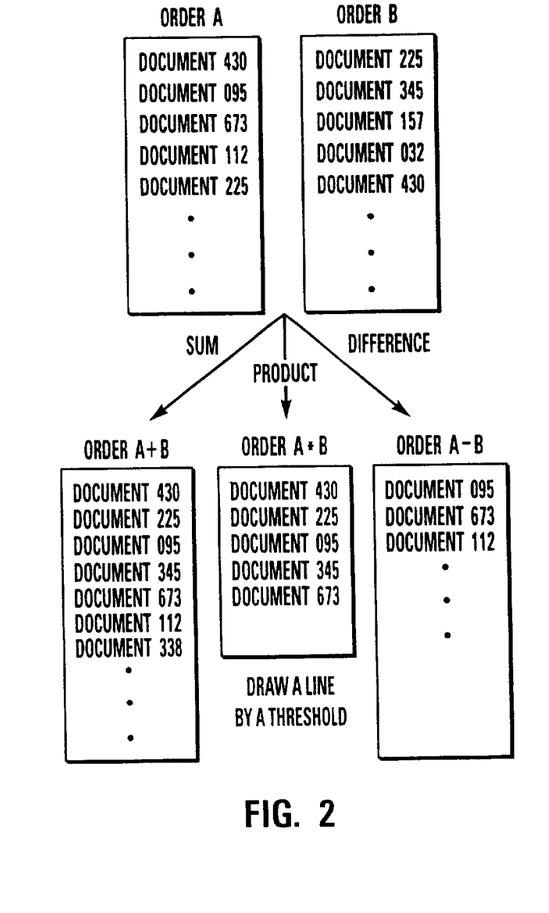
FIG. 2 is a diagram for showing an example of ranking composition of the present invention.

FIG. 2 shows an example of composition of ranking. Examples of the sum, intersection and difference are shown to collections of documents sorted by ranking metrics A and B. A line is drawn to the result of composition by a threshold, and highly ranked ones become the final search result. These calculations can be freely selected by a user.

Figure 3:
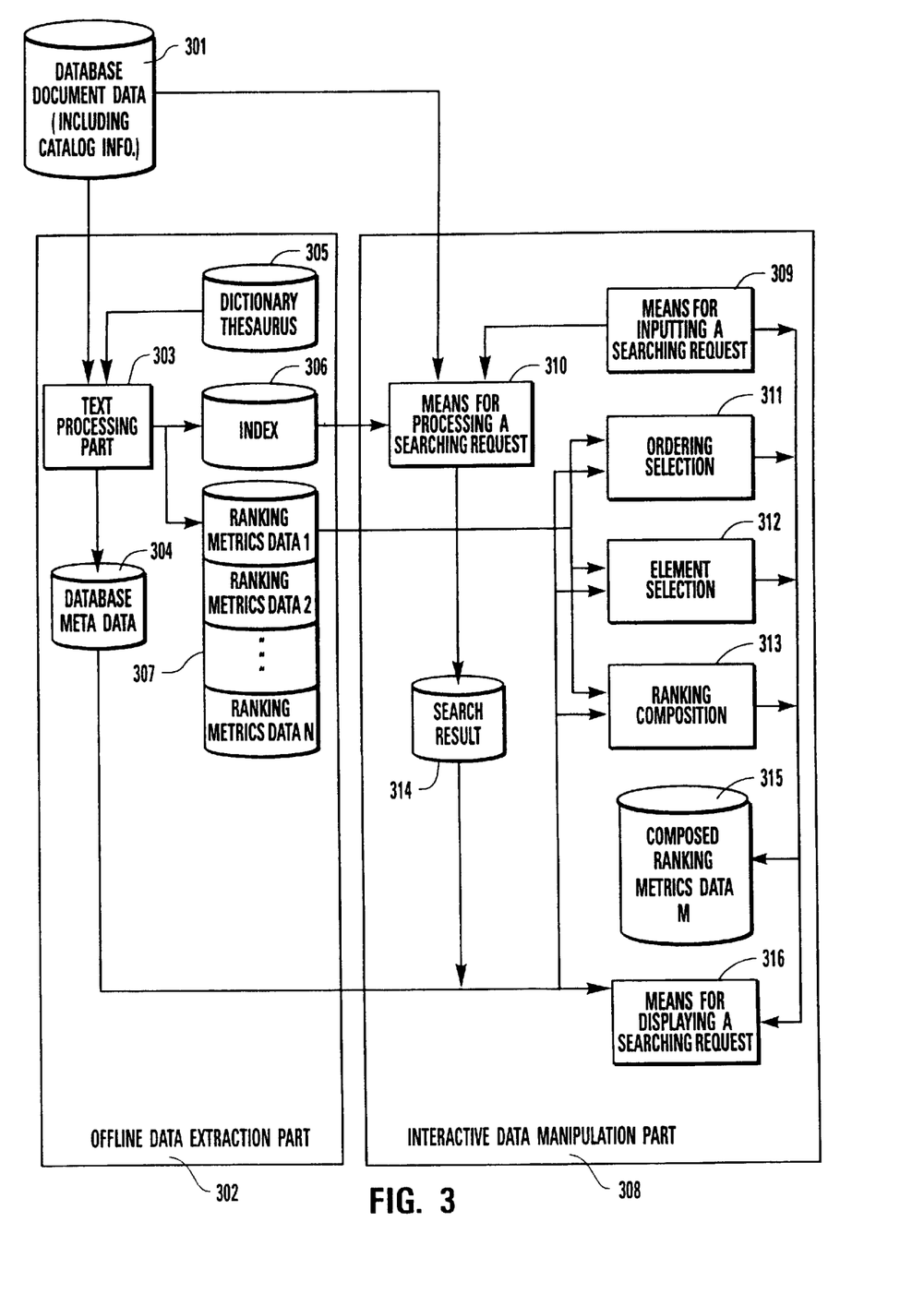
FIG. 3 is a block diagram of the searching system of the present invention.

FIG. 3 shows a block diagram of the searching system of the present invention. The searching system of the present invention comprises offline data extraction part 302 which extracts meta data for ranking metrics from a data set and provides an evaluable set of ranking metrics on searching, and interactive data manipulation part 308 for sorting in various ways the result of information searching by a user.

Block 301 is a set of data which is a subject of a database/document (including catalog information) data search. It is assumed that externally defined information of data itself such as frequency of update and the last update date is managed in advance as catalog information of individual data. Block 302 is an offline data extraction part for, in collecting source data, extracting an index necessary for searching and information necessary for ranking metrics.

Offline data extraction part 302 comprises text processing block 303 and meta data management 304. Block 303 is a text processing part which utilizes a dictionary/thesaurus for recognizing a word in text and giving its attribute and processing a tag, etc. Block 304 is document meta data which stores information (update date, byte number of text, link number, etc.) necessary for ranking metrics.

Block 305 is a dictionary/thesaurus which is a resource describing a word and its attribute, synonyms, superordinate/subordinate terms, related words, etc. Block 306 is an index which is a resource for acquiring from a word or a string pointers to data or documents containing it. Block 307 is ranking metrics data which is a resource describing an attribute necessary for arranging each data or document in specific order and a weight to be given to such an attribute.

Block 308 is an interactive data manipulation part for providing an interactive interface which provides a means for searching data and documents according to an instruction by a user to narrow them down to highly relevant ones.

Block 309 is a means for inputting a searching request which accepts, through a menu or a query, an instruction by a user as to a subject of searching. Block 310 is a means for processing a searching request which seeks data and a collection of documents meeting a searching request by utilizing an index, etc.

Block 311 is a ranking/ordering selection part which accepts selection by a user as to an ordering of arranging elements of a search result. Block 312 is an element selection part which seeks, from search result arranged by certain ranking metrics, different ranking metrics wherein a specific element is in the top rank according to selection by a user. Block 313 is a ranking composition part which prepares, from plural ranking metrics specified by a user, new ranking metrics with their sum or intersection.

Block 314 is a search result which is data or a collection of documents meeting a searching request by a user. Block 315 is composed ranking metrics data which, by composing a ranking, becomes a resource for storing information of temporary ranking metrics applied to current search result. Block 316 is a means for displaying a searching request which sequentially displays elements of search result under the search result and given ranking metrics (which may be plural), and simultaneously presenting display of plural results if plural ranking metrics are specified.

Moreover, information other than catalog information of individual data is analyzed by text processing part 303 as to its text to be managed as specific attribute/attribute value of meta data management part 304 according to recognition of elements such as word segmentation, links (anchors in the case of a Web page) and extraction respectively. Ranking metrics such as order of date or size correspond to mapping from this attribute value to a natural number and sorting them in ascending/descending order.

As to ranking metrics based on occurrence frequency of words, it is difficult, by a method of recording occurrence frequency of each individual word as a pair of {word/ occurrence frequency} all in meta data management part 304, to sort over a few million documents or records in real time or acquire K pieces of elements in higher-ranking positions. Such data is usually managed as an index of a search engine for a keyword search, and thus it is not realistic in terms of storage and processing time to generate from a specific document an inverted index of the words contained therein and their occurrence frequency.

Preferably, a vector space model should be utilized to calculate a page of high conformance to searching conditions on the basis of an arrangement represented by a frequency vector of the terms contained in each Web page. In such an arrangement, huge matrix V, which is number of terms N x number of documents M, is approximated by compressing it to principal components of several tens to several hundreds using a technique of singular value decomposition.

In the case of the present invention, this matrix V is utilized to allow creation of the following ranking metrics for specific domains/terminology. Creation of such ranking metrics is all offline work, so it does not affect efficiency while searching:

(1) When a set of terms occurring in a specific field (or a user's file) is given, rows of the above matrix V are shrunk only to those corresponding to these terms, and the above technique of singular value decomposition is applied. Thus, a feature vector of each document on the field can be calculated. A degree of relevance of each document in each individual search result is determined by a distance between a term vector (compressed to a principal component) used for a search and a feature vector of each document. Or, it is also possible to acquire from an original feature vector the centroid of a collection of documents on the field so that a distance from the centroid of each document is calculated in advance. In this case, while ranking metrics of documents are fixed regardless of searching conditions, calculation of sorting becomes faster.

(2) When a specific collection of documents is given, the rows of matrix V are shrunk to those corresponding to these documents to be processed likewise. Thus, it becomes possible to have ranking metrics such as a degree of relevance from a viewpoint of introducing new computer products and a degree of relevance from a viewpoint of a news document.

(3) Both are combined to rank highly relevant ones as to specific terms in a specific collection of documents. It is also possible to adopt hierarchical/nonhierarchical clustering instead of ranking metrics. In this case, the collection of documents are classified into clusters on the basis of feature vectors of the documents and then presented to a user. A function for defining ranking metrics is replaced by a function for giving a degree of relevance (a degree of similarity) in clustering. For instance, a distance between two feature vectors (cosine) may be calculated as a degree of similarity.

Interactive data manipulation part 308 comprises ordering selection part 311 for displaying search result of a query in order of selection, ranking composition part 313 for composing/displaying new ranking metrics from plural ranking metrics as specified by a user, and element selection part 312 for collecting in higher-ranking positions desirable data centering around a selected element. In ordering selection part 311, it is possible to specify other ranking metrics displayed in parallel with order of a search result returned by a search engine. It is possible to select by a user's specification or implementation whether to display search result by plural ranking metrics at a time or to always display it by finally selected ranking metrics.

If real time processing is considered, a higher speed can be implemented, for instance, by providing limitation wherein ranking metrics are only applied to the K highest positions of the first search result. Next, while it is possible to implement ranking composition part 313 for composing two orderings Fa and Fb in various forms, it can be simply implemented as follows, for instance.

The following linear equation defines a new ordering function, on the assumption that each ordering gives each data d integers Fa(d), Fb(d) where, the higher the ranking of an element is, the larger they are (provided that A, B and C possibly with subscripts are constants):

1) Sum of Fa and Fb (Fa+Fb): $A1^*Fa(d)+B1^*Fb(d)$

2) Intersection of Fa and Fb (Fa*Fb):

$$A2^*(Fa(d)-C)+B2^*(Fb(d)-D)$$

3) Difference of Fa and Fb (Fa−Fb/Fb−Fa):

$$A3^*Fa(d)-B3^*Fb(d), \text{ and } B4^*Fb(d)-A4^*Fa(d)$$

While A1–4 and B1–4 are coefficients for adjusting the values given to elements in higher-ranking positions in order Fa, Fb respectively to be almost the same, C and D are set as the values which the L-th elements of the search result with respect to Fa, Fb will take on respectively. Thus, composition of ordering can be defined at high speed and to an arbitrary number of ranking metrics.

To reverse the ordering, the signs (+,−) of Fa(d), Fb(d) must simply be reversed, and the following new ordering function can be defined so that a specified element e can be in the highest rank:

$Fc(d)=Fa(e)-Fa(d)$ if $Fa(d)>=Fa(e)$, otherwise $Fc(d)-Fa(d)-Fa(e)$ if $Fa(d)<Fa(e)$ Element selection part 312 can arrange data of order value close to the data selected by using the above new ordering functions. In the case that a search engine implements relevance feedback, search result by new ranking metrics can be displayed based on this data and the original query. By the ranking method of the present invention, when a search engine first arranges its search result and highly relevant data does not necessarily exist in higher-ranking positions, highly relevant data can efficiently be found if a user specifies an ordering from another viewpoint instead of searching a large amount of data himself or herself. In addition, if relevance feedback is utilized, it is possible to quickly reach searching conditions for collecting important data in higher-ranking positions, by adding the highly relevant data to the searching conditions.

Figure 4:
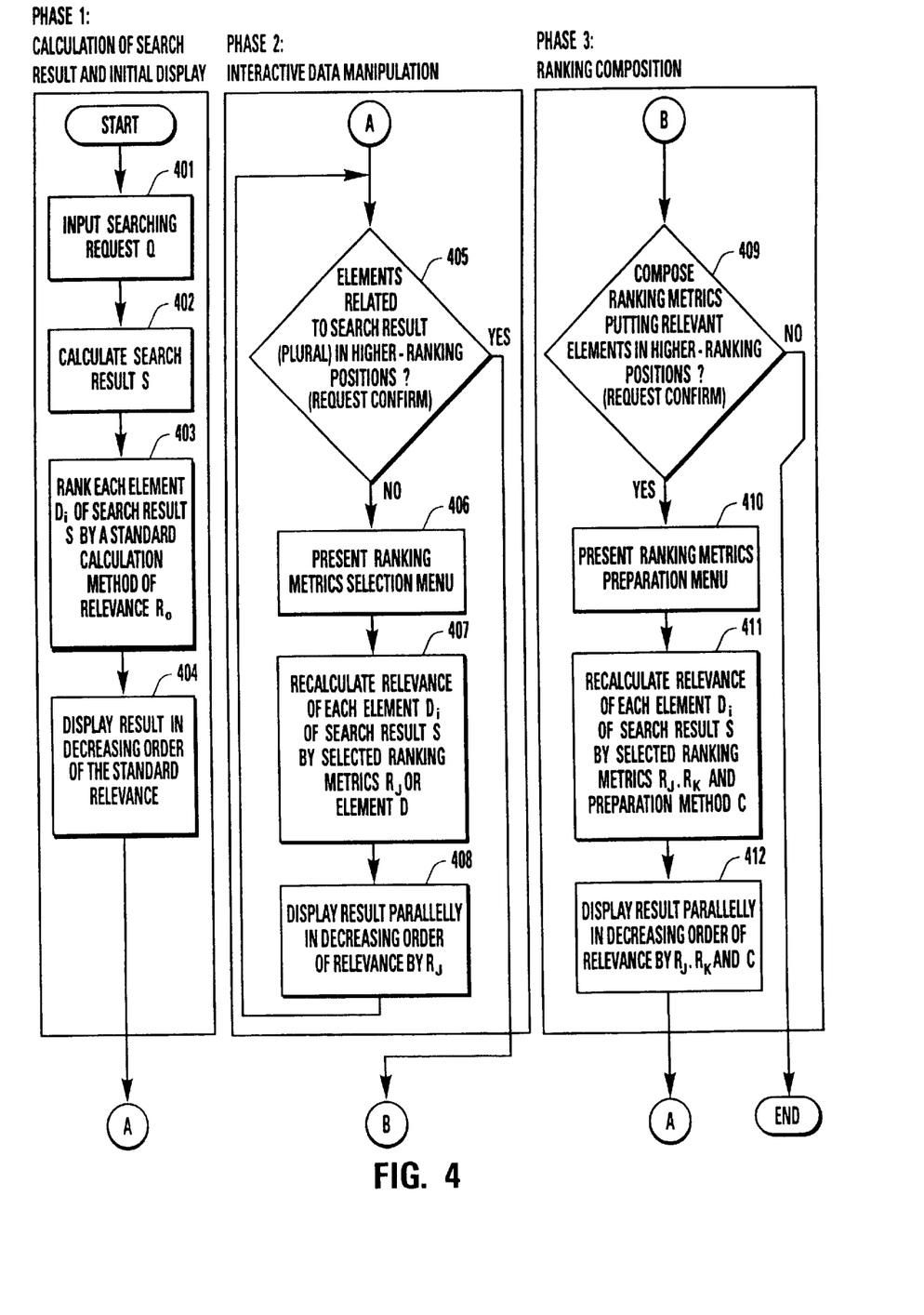
FIG. 4 is a flowchart of the searching method of the present invention.

FIG. 4 shows a flowchart of the method for searching of the present invention. First, in step 401, in means for processing a searching request 310, a query is acquired through means for inputting a searching request 309. This is referred to as query Q. Next, in step 402, query Q is evaluated based on index 306 so as to generate search result 314 which is a collection of documents to be a solution. This is referred to as solution S.

In step 403, a degree of relevance between each element included in search result 314 (referred to as document $d_i$) and query Q is calculated by a standard method for calculating a degree of relevance $R_o$ defined in the system. A method for calculating a degree of relevance is a method for calculating weight of a document by using one of the data of ranking metrics data 307 (represented as a vector or a matrix with weight per word/attribute specified). One of the data 307 is assigned to standard calculation of a degree of relevance.

Next, since step 403 associates each element $d_i$ of search result 314 with a degree of relevance (weight), in step 404, the elements are sorted in order of this weight. At this time, a certain threshold can be associated with ranking metrics so that any element with weight of the threshold or less can be eliminated as having no relation to query Q. To limit the size of solutions in step 402, these steps 402 to 404 can be applied by one operation.

Search result S wherein a degree of relevance of each element was calculated is visualized by means for displaying a searching request 316.

In step 405, it is confirmed to a user if a satisfactory list of elements (documents) was acquired by the method for calculating a degree of relevance used so far. If such a satisfactory list has not been acquired yet, it proceeds to step 406 in order to newly perform another calculation of a degree of relevance from ranking metrics data 307. If a current list of elements is satisfactory, it proceeds to step 409.

In step 406, a table of ranking metrics data 307 provided by the system is displayed to a user for selection. Other than ranking metrics data, the user can select one element d which appears in a search result so far and provide instructions of a change to rank it No.1.

In step 407, when ranking metrics data is newly selected in step 406, it is $R_j$, and a degree of relevance is calculated under $R_i$ by ordering selection 311 as to each element $d_i$ of search result S in the same procedure as in steps 403 to 404. If a certain element d is selected, ranking metrics are changed by element selection 312 so as to render weight of this element maximum (there are plural methods for changing weight, such as changing weight of a word or an attribute of ranking metrics data, and adjusting constants in calculation of a degree of relevance so as to render a degree of relevance of d maximum), and a degree of relevance of each element $d_i$ is recalculated.

In step 408, according to the degree of relevance of $d_i$ recalculated in steps 407, newly ranked elements are displayed. Again, user confirmation is sought at step 405. The process of steps 406 to 408 continues until user confirmation is received sending processing to step 409.

Next, in step 409, if lists of elements ranked from viewpoints of plural degrees of relevance respectively are all satisfactory, their ranking metrics are composed, and it proceeds to step 410 and displays an ranking composition menu so as to have a selection made whether to newly sort the elements with one ranking metrics. If a current list of elements is satisfactory, or if the current search is to be ended, it is terminated.

In step 410, two ranking metrics $R_j$ and $R_k$ of ranking metrics data 307 used so far and a composition method such as the sum and difference are selected in a ranking composition menu.

Then, in step 411, a new degree of relevance of each element $d_i$ of search result S is calculated in ranking composition 313 based on the ranking metrics and composition method selected in step 410. Ranking metrics data M composed at this time is held effective as composed ranking metrics data 315 through a searching session.

Lastly, in step 412, a degree of relevance specified in step 411 is calculated, and each element $d_i$ of search result S is displayed in means for displaying a searching request 316.

FIG. 5 shows an example of search result by the searching system of the present invention. The example in FIG. 5 is an example of a search in the case of ranking metrics composition (corresponding to step 412 in FIG. 4) where there are a result of searching a table of information field news by a "computer" (corresponding to step 404 in FIG. 4) and a result in the decreasing order of a degree of relevance calculated with more weight on "software" field (corresponding to step 408 in FIG. 4), and the sum (+) was selected for these as a type of calculation. Thus, a search result which has computer related news especially highly relevant to the software field in higher-ranking positions can be acquired.

Figure 6:
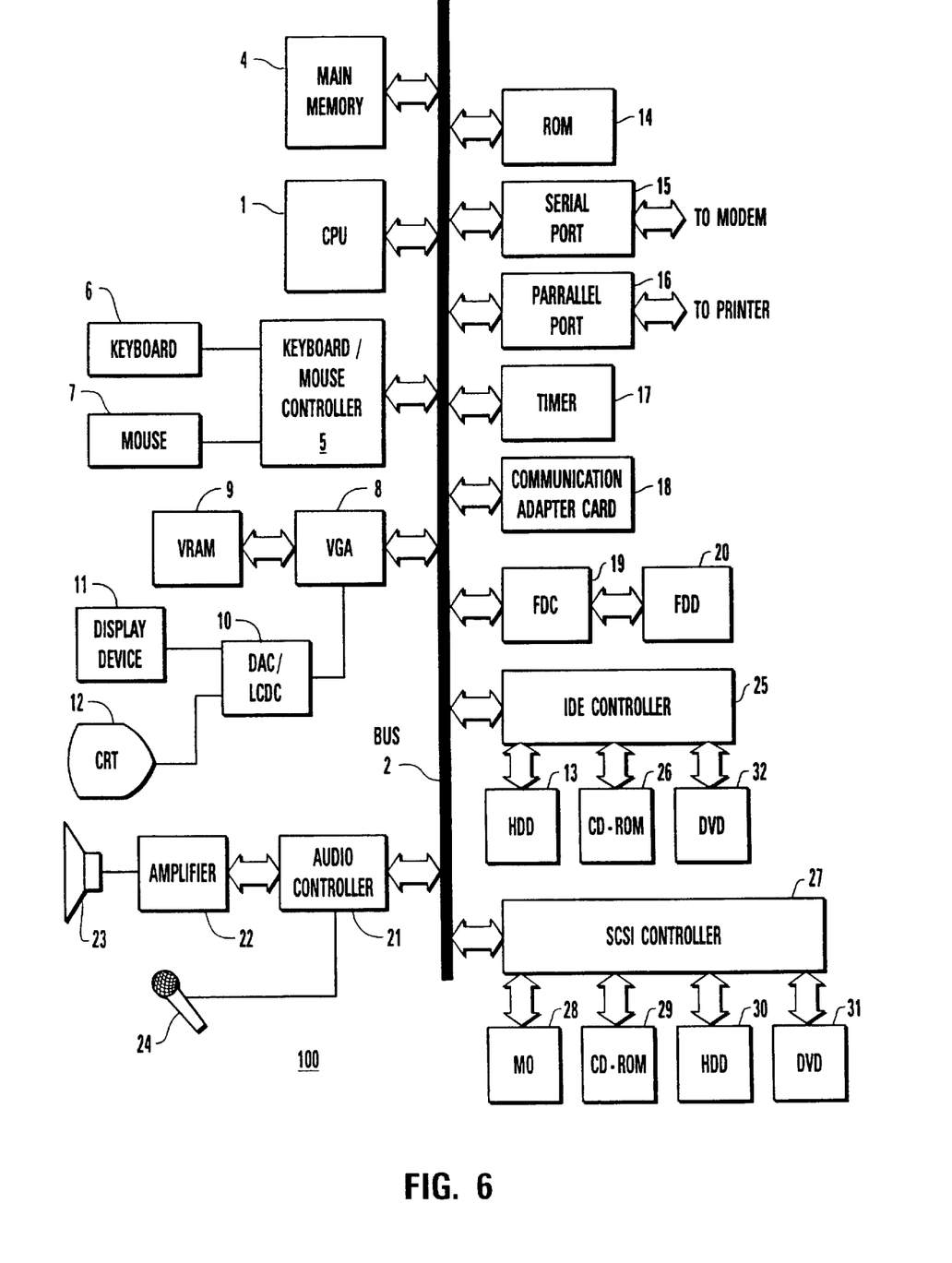
FIG. 6 is a diagram for showing an embodiment of hardware configuration of the system used in the searching system of the present invention.

FIG. 6 shows an embodiment of hardware configuration of a system used in the present invention. System 100 comprises a central processing unit (CPU) 1 and memory 4. CPU 1 and memory 4 are connected via bus 2 with hard disk drive 13 (or a storage medium drive such as CD-ROM 26 and DVD 32) as auxiliary storage by way of IDE controller 25. Likewise, CPU 1 and memory 4 are connected via bus 2 with hard disk drive 30 (or a storage medium drive such as MO 28, CD-ROM 29 and DVD 31) as auxiliary storage by way of SCSI controller 27. Preferably, document data 301, dictionary thesaurus 305, index 306, ranking metrics data 307 and document meta data 304 are stored in an auxiliary storage.

Floppy disk drive 20 is connected with bus 2 via floppy disk controller 19. A floppy disk is inserted into floppy disk drive 20, and a code or data of a computer program for giving instructions to a CPU and so on in synergy with an operating system to implement the present invention can be recorded on this floppy disk, hard disk drive 13 (or a storage media such as MO, CD-ROM and DVD) and ROM 14, which is executed by being loaded to memory 4. This code of a computer program can also be compressed or divided into two or more so as to be recorded on two or more media. While, search result 314 is normally stored in an auxiliary storage, it can be stored and calculated only in memory 4 if memory 4 is large enough.

System 100 can further have user interface hardware and comprise pointing device (a mouse, a joystick, etc.) 7 or keyboard 6 for entry and display 12 for presenting a user with visual data such as a search result. It is also possible to connect it with a printer via parallel port 16 or connect it with a modem via serial port 15.

This system 100 can be connected with a network via serial port 15 and a modem or communication adapter 18 (Ethernet or Tokenring card) etc. so as to communicate with other computers and so on. For instance, document data 301, etc. may be downloaded from Internet, or document data 301, ranking metrics data 307, etc. may be referred to from a server, etc. distributed by a local area network. Furthermore, it is possible to connect a remote transmitter-receiver with serial port 15 or parallel port 16 so as to exchange data by means of an infrared ray or an electric wave.

Speaker 23 receives a speech signal which is D/A (digital/analog) converted by audio controller 21 via amplifier 22 and outputs it as speech. In addition, audio controller 21 makes it possible to A/D (analog/digital) convert speech information received from microphone 24 and capture into the system speech information outside the system. It is also possible to use an application such as ViaVoice (a trademark of IBM) so that a searching command is issued by voice to select ranking metrics, select calculation and perform a search.

Thus, it may be easily understood that a searching system in the present invention is implementable by a communication terminal with a communication facility including an ordinary personal computer (PC) or a workstation, a notebook PC, a palmtop PC, a network computer, various household electrical appliances with a built-in computer such as a TV set, a game console with a communication facility, a telephone, a fax, a portable telephone, a PHS, an electronic organizer or combination of these. However, these components are taken as examples, and it does not follow that all of them are required components of the present invention.

As will be understood by one of ordinary skill in the art, computer programs or code such as that described herein are typically distributed as part of a computer program product that has a computer useable media or medium containing the program code. Therefore, "media", "medium", "computer useable medium", or "computer useable media", as used herein, may include a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

It will be likewise appreciated that the computer hardware upon which the invention is effected contains one or more processors, operating together, substantially independently, or distributed over a network, and further includes memory for storing the instructions and calculations necessary to perform the invention.

Those skilled in the art will recognize that a system according to the present invention may be created in a variety of different ways known in the art. For example, the hardware configuration shown in FIG. 6 may be configured with appropriate software so that the computing device functions as described hereafter. Furthermore, discrete electronic components may be used to create a system that implements all or part of the functional. Finally, note that combinations of multiple computing devices running appropriate software or discrete electrical components can be used in like fashion. Essentially, the hardware is configured (whether by software, custom designed, etc.) to perform the functional elements making up the present invention.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or "step for."

We claim:

1. A method in a searching system for processing a collection of documents derived from a query of an associated database to acquire a final search result by an arithmetic operation between search results sorted by different ranking metrics, the method comprising:

sorting said collection of documents using a first ranking metric to create a first ranked ordering of at least a first portion of said collection of documents;

sorting said collection of documents using a second ranking metric different than said first ranking metric to create a second ranked ordering of at least a second portion of said collection of documents; and, performing an arithmetic operation on the first ranked ordering and the second ranked ordering to derive a third ranked ordering of the collection of documents as said final search result.

2. A method as recited in claim 1 further including providing the collection of documents by performing a query of an associated database.

3. A method as recited in claim 1 wherein the steps of sorting said collection of documents using said first and second ranking metrics include using user selected first and second ranking metrics.

4. A method as recited in claim 1 wherein the steps of sorting said collection of documents using said first and second ranking metrics include using first and second ranking metrics selected based on characteristics of an example document.

5. A method as recited in claim 1 wherein the steps of sorting said collection of documents using first and second ranking metrics include using first and second ranking metrics selected from the group consisting of: date and time of document publication, document size, frequency of document update, number of links included in a document, extent of inclusion of terminology related to prescribed information, and number of keywords related to prescribed information.

6. A method as recited in claim 1 wherein the step of performing said arithmetical operation includes performing an arithmetic operation selected from the group consisting of: a sum of said first and second ranked orderings, an intersection of said first and second ranked orderings, and a difference between said first and second ranked orderings.

7. A computer program product comprising a computer usable medium having computer-executable instructions embodied therein to perform a method for processing a collection of documents derived from a query of an associated database to acquire a final search result by an arithmetic operation performed on search results sorted by different ranking metrics, the method comprising:

using a first ranking metric $M_j$, associating each element $d_i$ of said collection of documents with a degree of relevance $R_i$ to said first ranking metric $M_i$ to create a first ranked ordering of said collection of documents;

using a second ranking metric $M_k$, associating each element of i of said collection of documents with a degree of relevance $R_k$ to said second ranking metric $M_k$ to create a second ranked ordering of said collection of documents; and, performing an arithmetic operation on the first ranked ordering and the second ranked ordering to derive a third ranked ordering of the collection of documents as said final search result.

8. A system for processing a collection of documents comprising means for implementing a method for processing a collection of documents derived from a query of an associated database to acquire a final search result by an arithmetic operation performed on search results sorted by different ranking metrics, the system comprising:

using a first ranking metric $M_j$, associating each element $d_i$ of said collection of documents with a degree of relevance $R_i$ to said first ranking metric $M_i$ to create a first ranked ordering of said collection of documents;

using a second ranking metric $M_j$, associating each element of i of said collection of documents with a degree of relevance $R_i$ to said second ranking metric $M_k$ to create a second ranked ordering of said collection of documents; and, performing an arithmetic operation on the first ranked ordering and the second ranked ordering to derive a third ranked ordering of the collection of documents as said final search result.

9. A method for searching documents related to prescribed information from a collection of documents, comprising the steps of:

sorting said collection of documents with multiple ranking metrics to generate sorted collections of documents;

determining a new collection of documents in higher-ranking positions of said sorted collections of documents;

selecting an arithmetic operation from a group including a sum of said sorted and new collections of documents, an intersection of said sorted and new collections of documents, and a difference between said sorted and new collections of documents;

performing said arithmetic operation between said new collection of documents and said sorted collection of documents; and determining documents in higher-ranking positions of a result of said arithmetic operation as a search result.

10. The method according to claim 9 further including the step of selecting said multiple ranking metrics from the group consisting of date and time of document publication, document size, frequency of document update, number of links included in a document, extent of inclusion of terminology related to prescribed information, and number of keywords related to prescribed information.

11. The method according to claim 9 wherein the steps of sorting and determining are based on ranking data including an array in vector representation indicating a property of the document and is calculated by degree of relevance of the documents determined by a function expression seeking from said collection of documents, distance or degree of relevance between a vector of a term used for the search and a feature vector of each document.

12. A system for searching documents related to prescribed information from a collection of documents, comprising:

means for creating ranking data for said collection of documents by sorting the collection of documents with multiple ranking metrics to generate a search result;

means for searching from said collection of documents based on a query from a user of the system;

means for selecting multiple ranking metrics for said search result based on said ranking data;

means for, according to the selected multiple ranking metrics, sorting said search result and determining higher-ranking positions of said collection of documents;

means for selecting an arithmetic operation for said higher-ranking positions of said collection of documents from a group including a sum of said search result and said collection of documents, an intersection of said search result and said collection of documents, and a difference between said search result and said collection of documents; and means for, according to the selected arithmetic operation, outputting a final result of said search.

13. The system according to claim 12 wherein said means for creating said ranking data includes an array in vector representation indicating a property of the document and is calculated by degree of relevance of the documents determined by a function expression seeking from said collection of documents, distance or degree of relevance between a vector of a term used for the search and a feature vector of each document.

14. The system according to claim 12 wherein said means for creating ranking data includes means for creating ranking data for the collection of documents by sorting the collection of documents using multiple ranking metrics selected from the group consisting of date and time of document publication, document size, frequency of document update, number of links included in a document, extent of inclusion of terminology related to prescribed information, and number of keywords related to prescribed information.

15. A medium including a program executable by a computer to search documents related to prescribed information from a collection of documents, said program causing the computer to perform the steps of:

sorting said collection of documents with multiple ranking metrics to generate a set of sorted collections of documents;

determining a new collection of documents in higher-ranking positions of said set of sorted collections of documents;

selecting an arithmetical operation from a group including a sum of said sorted and new collections of documents, an intersection of said sorted and new collections of documents, and a difference between said sorted and new collections of documents;

performing said arithmetic operation between said new collection of documents and said set of sorted collections of documents; and determining documents in higher-ranking positions of a result of said arithmetic operation as a search result.

16. The medium according to claim 15 executable to perform the further step of selecting said multiple ranking metrics from the group consisting of date and time document publication, document size, frequency of document update, number of links included in a document, extent of inclusion of terminology related to prescribed information, and number of keywords related to prescribed information.

17. The medium according to claim 15 executable to perform said sorting and determining steps based on ranking data that is an array in vector representation indicating property of the document and is calculated by degree of relevance of the documents determined by a function expression seeking from said collection of documents, distance or degree of relevance between a vector of a term used for the search and a feature vector of each document.

* * * * *